(12) United States Patent
Zaragoza (10) Patent No.: US 9,996,621 B2
(45) Date of Patent: Jun. 12, 2018

(54) SYSTEM AND METHOD FOR RETRIEVING INTERNET PAGES USING PAGE PARTITIONS

(71) Applicant: AMAZON TECHNOLOGIES, INC., Seattle, WA (US)

(72) Inventor: Hugo Zaragoza, Barcelona (ES)

(73) Assignee: Amazon Technologies, Inc., Seattle, WA (US)

(*) Notice: Subject to any disclaimer, the term of this patent is extended or adjusted under 35 U.S.C. 154(b) by 521 days.

(21) Appl. No.: 14/317,523

(22) Filed: Jun. 27, 2014

(65) Prior Publication Data

US 2015/0074087 A1   Mar. 12, 2015

Related U.S. Application Data

(60) Provisional application No. 61/843,723, filed on Jul. 8, 2013.

(51) Int. Cl.
*G06F 17/30* (2006.01)
(52) U.S. Cl.
CPC .............................. *G06F 17/30867* (2013.01)

(58) Field of Classification Search
CPC ........... G06F 17/3087; G06F 17/30864; G06F 17/30321; G06F 17/30
USPC ........................................................ 707/722
See application file for complete search history.

(56) References Cited

U.S. PATENT DOCUMENTS

| | | | | |
|---|---|---|---|---|
| 5,907,837 | A * | 5/1999 | Ferrel | G06F 17/3089 |
| 5,960,194 | A * | 9/1999 | Choy | G06F 9/355 |
| 6,115,705 | A * | 9/2000 | Larson | G06F 17/30489 |
| 6,393,415 | B1 * | 5/2002 | Getchius | G06F 17/3048 |
| 8,261,020 | B2 * | 9/2012 | Krishnaprasad | G06F 12/0813 711/118 |
| 8,631,028 | B1 * | 1/2014 | Pettovello | G06F 17/30938 707/765 |
| 2005/0267871 | A1 * | 12/2005 | Marchisio | G06F 17/30672 |
| 2011/0022582 | A1 * | 1/2011 | Unnikrishnan | G06F 17/30864 707/715 |

* cited by examiner

*Primary Examiner* — Sheree Brown
(74) *Attorney, Agent, or Firm* — Lindauer Law, PLLC

(57) ABSTRACT

A system for and method for providing pages, more specifically a system includes a server configured to receive a query and an engine that is able to retrieve a set of pages by first retrieving a partition that contains them.

30 Claims, 7 Drawing Sheets

SYSTEM AND METHOD FOR RETRIEVING INTERNET PAGES USING PAGE PARTITIONS

CROSS-REFERENCE TO RELATED APPLICATIONS

This application arises from provisional application No. 61/843,723 filed on Jul. 8, 2013 and claims the benefit thereof.

BACKGROUND OF THE INVENTION

Traditional retrieval engines (such as Web Search Engines and Corporate Search Engines) employ an index, which contains a collection of documents (such as files, web pages, etc.) stored in such a way as to make the retrieval of documents efficient when a user query arrives.

Traditional retrieval engines function as follows: the engine relieves a query, and retrieves some documents from the index that are considered relevant to the query (for example, those that match the keywords in the query).

This requires that the index store a description of all the documents before the retrieval phase. For example, when issuing a query to a web search engine, the web search engine index contains a description (such as the URL and title) of all the web documents that can be retrieved. This provides very high efficiency (e.g. speedy of retrieval) but has the very high storage cost of having to store all the documents in the index prior to the retrieval.

SUMMARY OF THE INVENTION

This invention is directed to system, methods and computer programs products for document storage and indexing.

Typically, a search index will store an individual description of each document. In turn, this patent describes a way to store descriptions of sets of documents that have been merged together.

This will allow a reduction in the required storage space of the index, because the individual documents do not have to be stored individually, but a group, or partition, is employed for multiple documents.

The method to do so is to partition the space of documents to be retrieved and storing in the index descriptions of the partitions instead of storing descriptions of the individual documents.

In one aspect, the method describes how to retrieve documents in response to a query, the engine needs to retrieve first the partition descriptions, then fetch all the documents in the retrieved partitions and filter then the pages not relevant to the query.

In another aspect, a computing device for retrieving pages when indexed within partitions is disclosed in accordance with yet another aspect. The computing device comprises a query input module that receives a user query comprising keywords and a partition search engine that generates pages results responsive to a user query from a partition summary index.

In another aspect, a computer-readable storage medium tangibly storing thereon computer program instructions capable of being executed by a computer processor is disclosed. The computer program instructions facilitate receiving, by a processor, a user query for a collection pages. The instructions facilitate the processor to identify at least one keyword comprised within the query. The instructions further cause the processor to access a partition summary index that indexes summaries of partitions grouping a set of pages. The processor retrieves quotes comprising the keyword and quotes that have the keyword as a respective attribute in the quote index as being relevant to the user query and transmits them to the user.

These and other aspects and embodiments will be apparent to those of ordinary skill in the art by reference to the following detailed description and the accompanying drawings.

BRIEF DESCRIPTION OF THE DRAWINGS

The invention will be further understood from the following description with reference to the drawings in which.

DESCRIPTION

Figure 1:
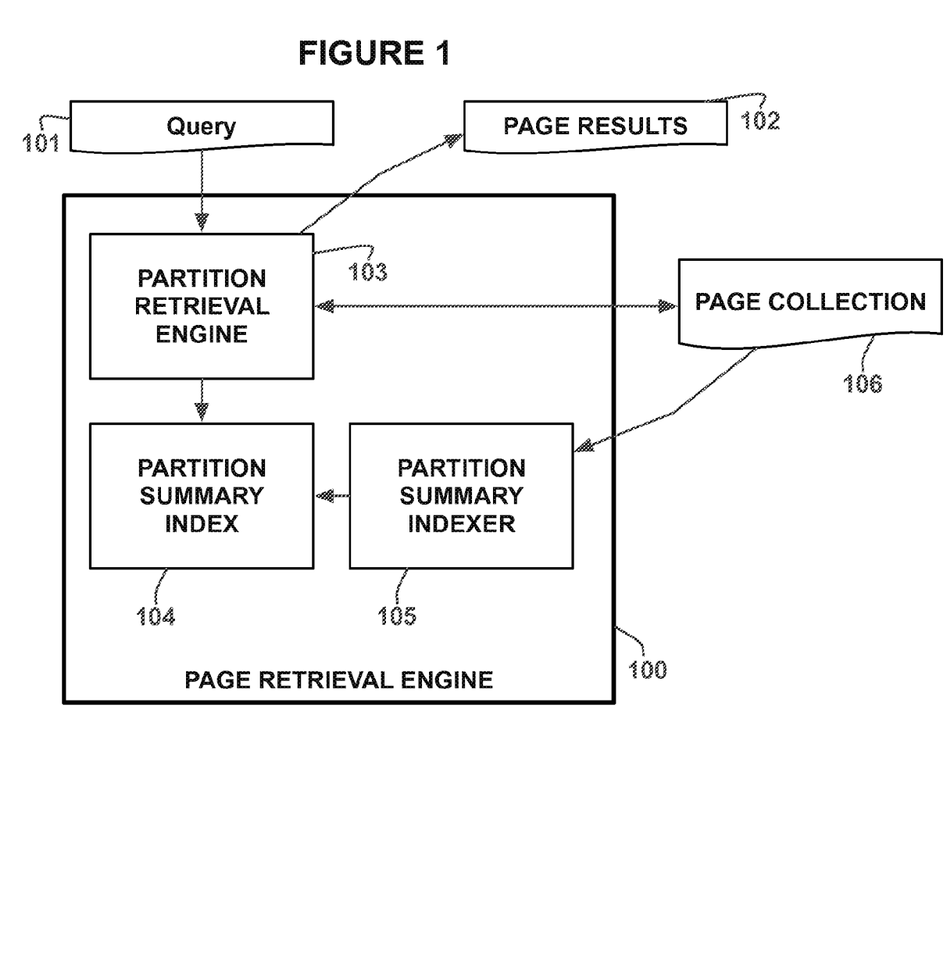
FIG. 1 is a block diagram of a page retrieval engine containing a partition retrieval engine, partition summary index, and a partition summary indexer.

FIG. 1 is a block diagram of an embodiment wherein a partition retrieval engine 103 receives a query 101, and returns page results 102 by accessing the partition summary index 104 and the page collection. The partition summary index is constructed and updated by the partition summary indexer 105, which accesses the page collection 106.

Figure 2:
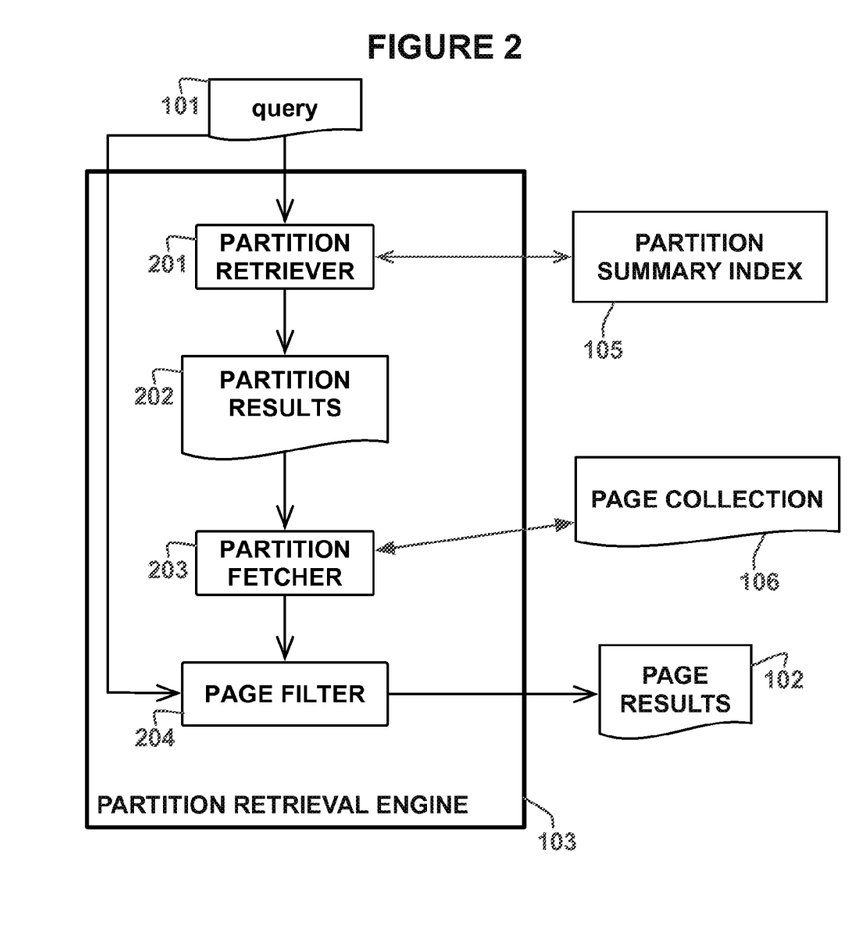
FIG. 2 is a block diagram of a partition retrieval engine returning page results as response from a query; it access a partition summary index and a page collection.

FIG. 2 is a block diagram of an embodiment wherein a partition retrieval engine 103 receives a query 101, and returns page results 102 by accessing the partition summary index 105. In this embodiment a partition retriever 201 receives the query and accesses the partition summary index 105 to retrieve the partition results 202, which is all the partition descriptions that match the query. The partition fetcher 203 receives the partition results and retrieves all the pages in the page collection corresponding to the partition results. The page filter 204 receives all the pages fetched and filters them to select the ones matching the query 101. The pages that pass the page filter are returned as page results 102.

Figure 3:
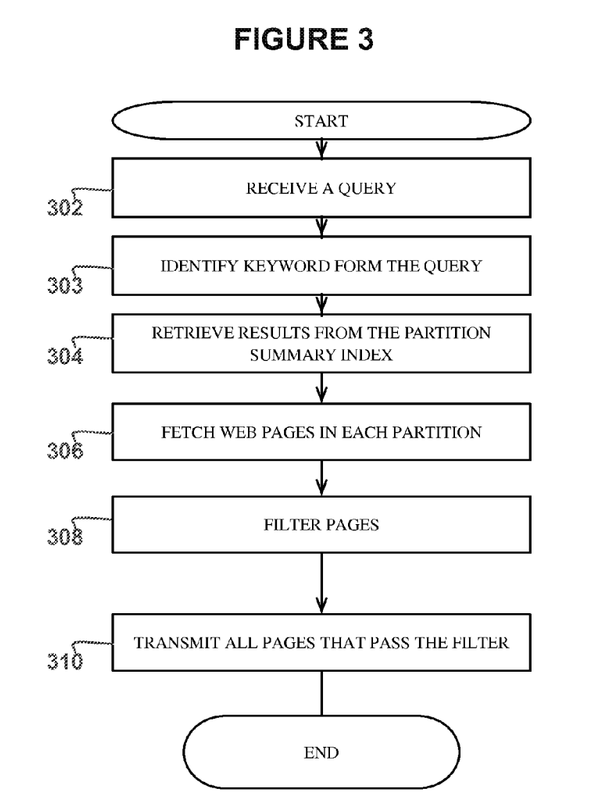
FIG. 3 is a flowchart illustrating the steps performed by the server computer in order to provide pages in response to a user query.

FIG. 3 shows a flowchart illustrating an embodiment of the steps performed by a server computer in order to provide pages in response to a user query. The procedure commences at step 302 with the server receiving a query for pages. The query is analyzed to extract the keywords as shown at 303. Based on the extracted keywords, the results relevant to the query are retrieved from the partition summary index 104 by the server as shown at step 304. The partition summary index 104 can be a component stored in a computer readable medium either on the server or a disparate machine, which is communicatively coupled to the server receiving the user query. In one aspect, the results that can include documents, pages or combinations thereof can be retrieved based on matching the received keyword to the indexed terms or keywords stored in the partition summary index 104.

In accordance with further aspects, the partition summaries can either comprise the keywords in the query or they can have the keywords as one of the associated attributes or characteristics listed in the partition summaries index 104. For example, in accordance with one aspect, the input received in the query can match one of the respective attributes e.g., 'quote by' or 'topics' or 'keywords' of different partition summaries and all the partition summaries associated with such matching attributes are retrieved as being relevant to the query. By the way of illustration and not limitation, the information obtained from the partition summary index 104 can include partition summaries representing web domains, or web sub-domains.

Each partition summary obtained from the partition summary index 104 is further processed as follows. The partition fetcher 203 receives each partition summary in step 306 and fetches or accesses or downloads all the pages in the partition from the page collection 106. For example, in accordance with one aspect, the partition summary represents one web domain and the fetcher downloads form the Internet all the pages in that web domain.

All the pages obtained by the fetcher in step 306 are then filtered in step 308 to remove pages not relevant to the original query 101 received in step 302.

In the last step 310 all the pages that have passed the filter in step 308 are transmitted.

We have described how the page retrieval engine of this invention return s pages as a result to a query. We will now describe how the partition summary index is updated.

Figure 4:
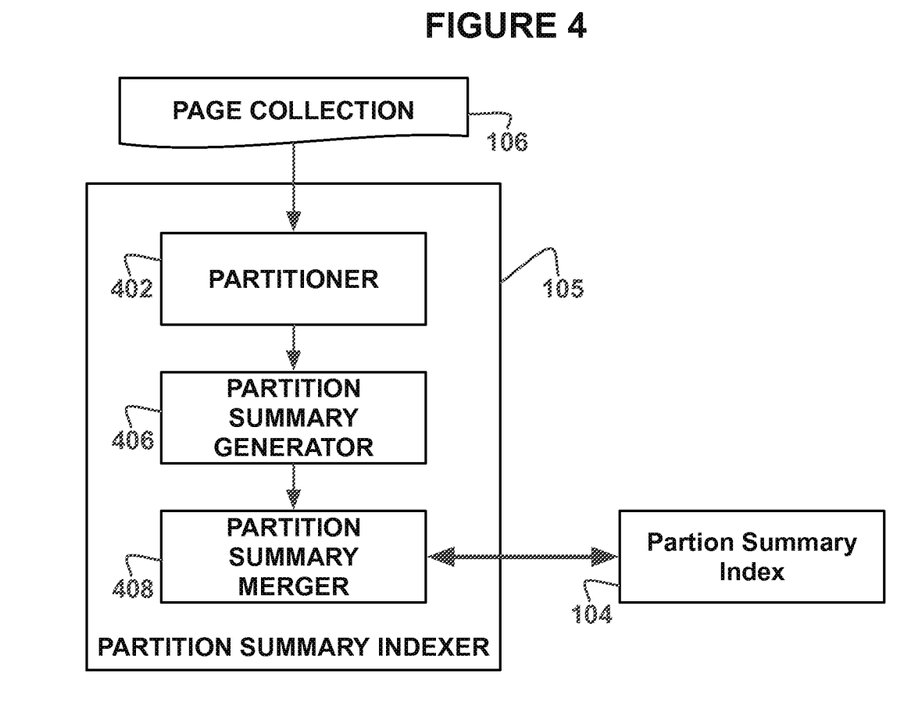
FIG. 4 is a block diagram of the partition summary indexer, which processes and indexes a page collection into the partition summary index.

FIG. 4 is a block diagram of an embodiment wherein a partition summary indexer 105 accesses a page collection 106 and updates the partition summary index 103. In this embodiment a partitioner 402 receives the pages in the collection, partitions them by assigning to each page a partition key, and then the partition summary generator computes partition summaries for each partition. The partition summaries computed in 406 are passed to the partition summary merger 408. The partition summary merger 408 retrieves from the partition summary index 103 the existing partition summaries, merges them with the new partition summaries obtained from 406 and updates the partition summary index 103 with the merged summaries.

Figure 5:
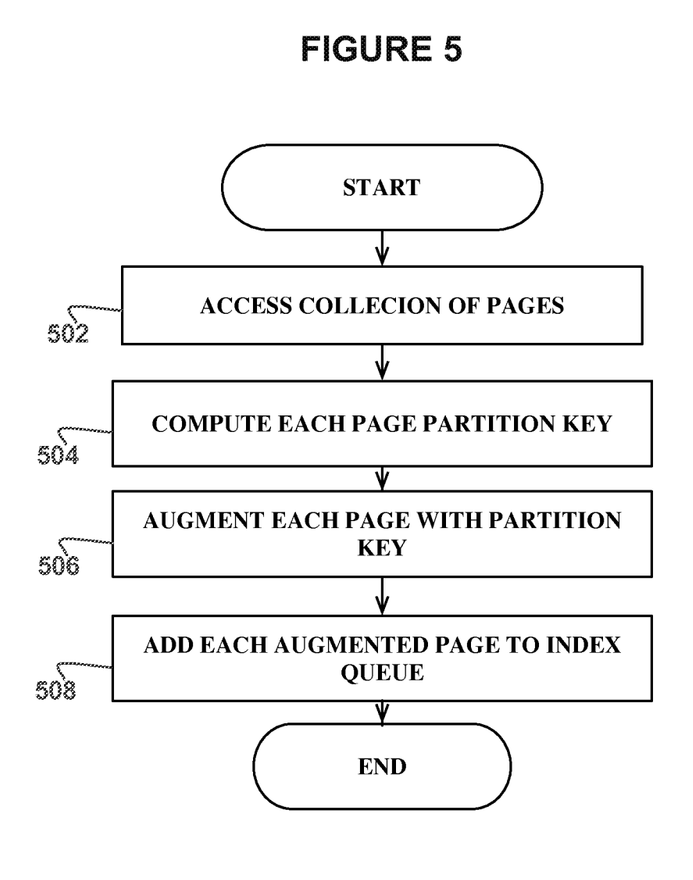
FIG. 5 is a flowchart illustrating the steps performed by the partition summary indexer in order to compute page partition keys.
Figure 6:
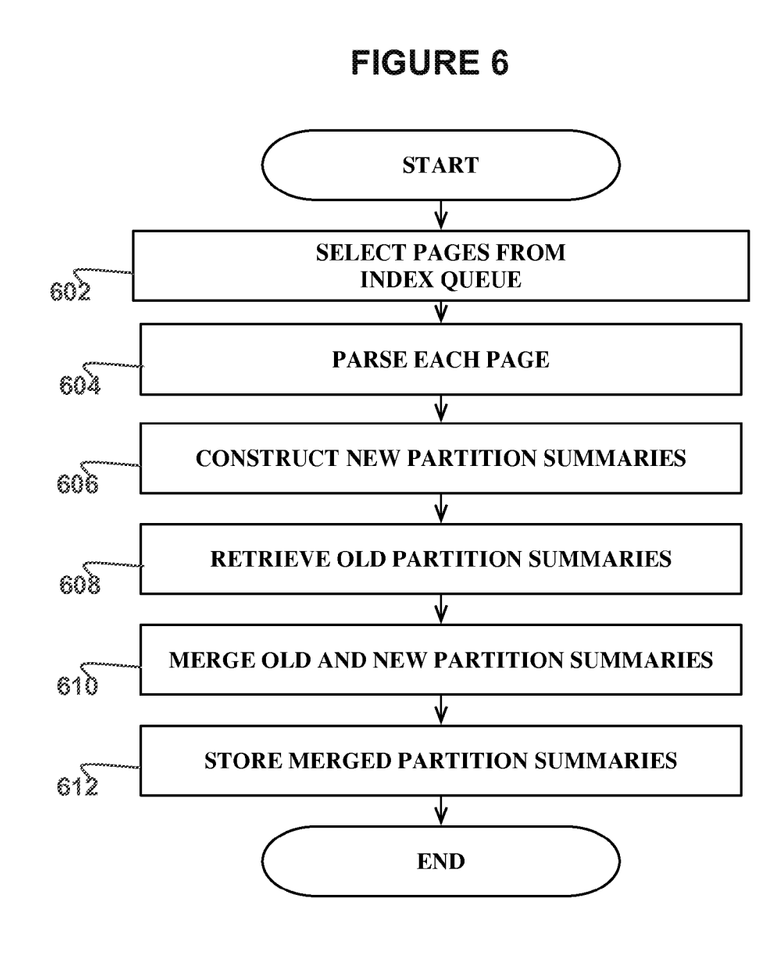
FIG. 6 is a flowchart illustrating the steps performed by the partition summary indexer in order to compute and store partition summary indexes.

FIG. 5 and FIG. 6 show two flowcharts illustrating an embodiment of the steps performed by the partition summary indexer 105. Starting in FIG. 5, the collection of pages is accessed in step 502. The partitioner 402 computes a page partition key for each page at step 504. Each page has a page identifier. Examples of page identifiers are file paths or unique resource locators.

A page partition key uniquely identifies a partition with respect to any other partition. A partition key is computed from a page identifier and is the same for all the pages within the partition. A partition key can be computed by hashing the top-level domain of a page identifier. Alternatively a partition key can be computed by hashing the top-level domain of a page identifier. Alternatively a partition key can be computed by hashing the domain of a page identifier. Alternatively a partition key can be computed by hashing a prefix of the page identifier. Alternatively a partition key can be computed by any combination of the previously described methods.

The pages are augmented with the obtained partition key in step 506, and the augmented pages are added to an index queue in step 508.

FIG. 6 illustrates further steps that are performed by the partition summary generator 406 and partition summary merger 408. In step 602 the indexer access the index queue and selects pages from the queue belonging to one partition. All the pages obtained in 602 are parsed in step 604 to construct a new partition summary in 606.

A partition summary is computed from a set of pages with the same partition key. The pages are first parsed in step 604. A continuous stream of text can be initially separated into tokens that include words, phrases or even punctuation marks. The partition summary can be constructed by concatenating all the tokens in the set of pages with the same partition key. Alternatively a partition summary can be constructed by assigning a unique identifier to each token and recording the unique identifiers of the tokens obtained in the parsing stage 604. In another embodiment all the repeated tokens can be eliminated and the tokens may be sorted alphabetically. In another embodiment tokens present in a dictionary (such as a stop-word list or a precompiled set of tokens that are not desired) can be eliminated prior to the construction of the summary. In another embodiment tokens with frequency higher or lower than a given threshold may be eliminated prior to the construction of the summary. In another embodiment all the tokens collected in step 604 can be hashed and the resulting hash key can be used as the partition summary.

In order to merge the newly constructed summary with the summary existing in the index, in step 608 the partition summary merger 408 receives the partition summaries computed in step 606 (from now on referred as the "new partition summaries") and retrieves from the partition summary index 410 the existing version of these partition summaries (from now on referred as the "old partition summaries"). Then, in step 610 the old and new partition summaries are merged and finally stored in step 612.

In one embodiment old and new partitions summaries can be merged by concatenating all the tokens in both partitions. In another embodiment old and new partitions can be merged by adding the frequencies of tokens in the new and old summaries. In another embodiment the old and new summaries can be weighted, multiplying by a constant factor the frequencies of the old summary and by another constant factor the frequencies of the new summary before merging the two by adding the weighted frequencies. The constant factors can depend on several properties of the partition and the pages in the partition. The constant factor can depend on the number of pages used to compute the old or the new partition summaries. The constant factor can depend on the age of the pages used to compute the old or the new partition summaries. The constant factor can depend on the time since the last update of the old partition summary.

Application programs using the methods disclosed herein may be loaded and executed on a variety of computer systems comprising a variety of hardware components. An exemplary computer system and exemplary operating environment for practicing the methods disclosed herein is described below.

Exemplary Operating Environment

Figure 7:
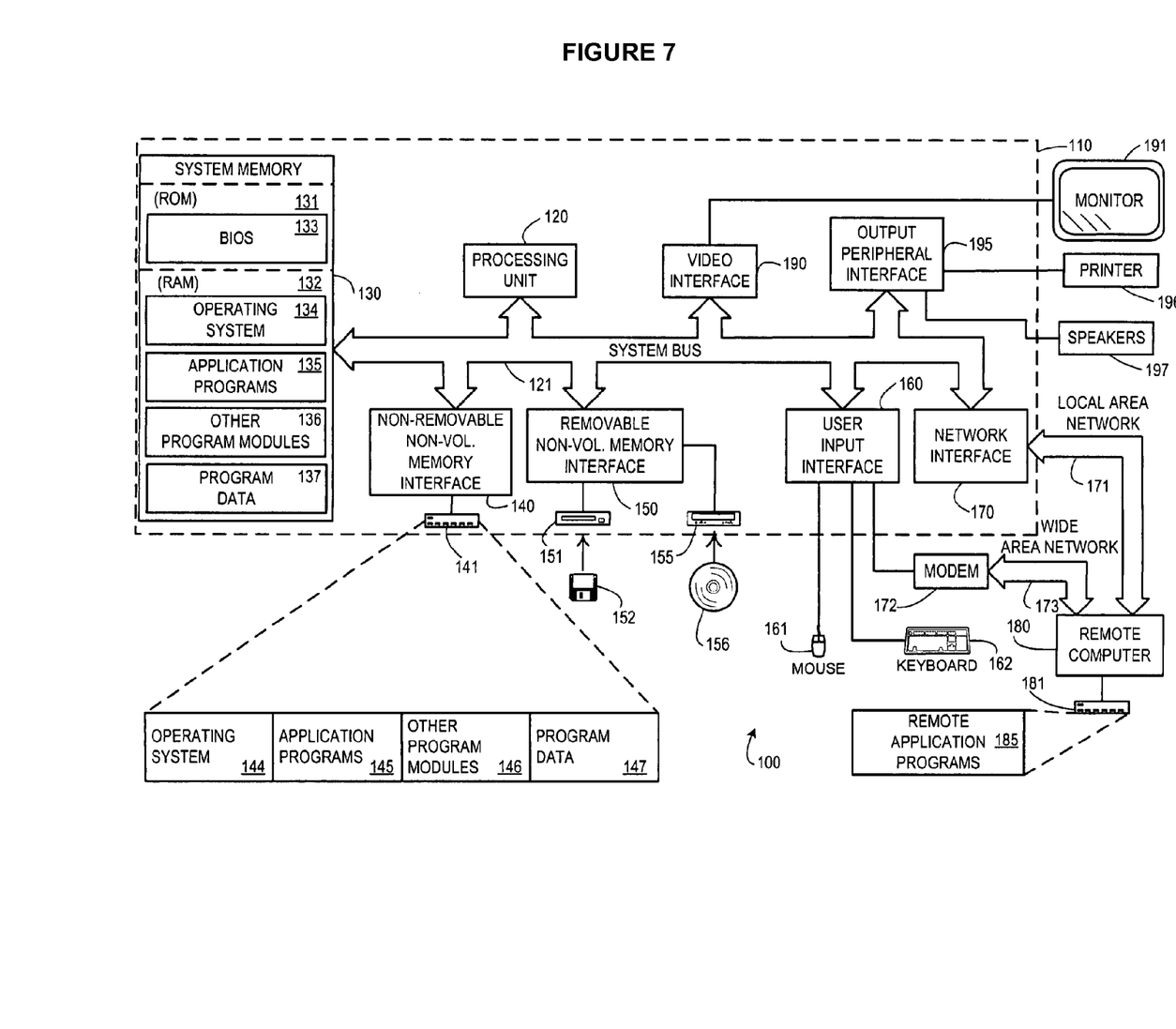
FIG. 7 is a block diagram of some of the primary components of an exemplary operating environment for implementation of the methods and processes disclosed herein.

FIG. 7 illustrates an example of a suitable computing system environment 100 on which the methods disclosed herein may be implemented. The computing system environment 100 is only one example of a suitable computing environment and is not intended to suggest any limitation as to the scope of use or functionality of the methods disclosed herein. Neither should the computing environment 100 be interpreted as having any dependency or requirement relating to any one or combination of components illustrated in the exemplary operating environment 100.

The methods disclosed herein are operational with numerous other general purpose or special purpose computing system environments or configurations. Examples of well-known computing systems, environments, and/or configurations that may be suitable for use with the methods disclosed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The methods and processes disclosed herein may be described in the general context of computer-executable instructions, such as program modules, being executed by a computer. Generally, program modules include routines, programs, objects, components, data structures, etc. that perform particular tasks or implement particular abstract data types. The methods and processes disclosed herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the methods and processes disclosed herein includes a general purpose computing device in the form of a computer 110. Components of computer 110 may include, but are not limited to, a processing unit 120, a system memory 130, and a system bus 121 that couples various system components including, but not limited to, system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media as used herein.

System memory 130 includes computer storage media in the form of volatile and/or nonvolatile memory such as read only memory (ROM) 131 and random access memory (RAM) 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 7 provide storage of computer readable instructions, data structures, program modules and other data for computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to processing unit 120 through a user input interface 160 that is coupled to system bus 121, but may be connected by other interface and bus structures, such as a parallel port, game port or a universal serial bus (USB). A monitor 191 or other type of display device is also connected to system bus 121 via an interface, such as a video interface 190. In addition to monitor 191, computer 110 may also include other peripheral output devices such as speakers 197 and printer 196, which may be connected through an output peripheral interface 195.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Methods and processes disclosed herein may be implemented using one or more application programs including, but not limited to, a server system software application (e.g., WINDOWS SERVER SYSTEM™ software application), a search ranking application, and an application for generating, maintaining and storing usage data of documents within a network space (e.g., WINDOWS® SHAREPOINT® Services application), any one of which could be one of numerous application programs designated as application programs 135, application programs 145 and remote application programs 185 in exemplary system 100.

As mentioned above, those skilled in the art will appreciate that the disclosed methods of retrieving and storing descriptions of sets of documents that have been merged together may be implemented in other computer system configurations, including hand-held devices, multiprocessor systems, microprocessor-based or programmable consumer electronics, networked personal computers, minicomputers, mainframe computers, and the like. The disclosed methods of retrieving and storing descriptions of sets of documents that have been merged together may also be practiced in distributed computing environments, where tasks are performed by remote processing devices that are linked through a communications network. In a distributed computing environment, program modules may be located in both local and remote memory storage devices.

What is claimed is:

1. A computer-implemented method to provide pages, comprising:
    receiving, by a processor, query data indicative of a search that includes keywords;
    identifying, by the processor, the keywords within the query data;
    accessing, by the processor, a partition summary index that stores summaries of individual partitions independent of storing descriptions of individual pages;
    retrieving, by the processor, a set of partitions based on the summaries of the individual partitions corresponding to the keywords;
    fetching, by the processor, a set of pages for each of the partitions within the set of partitions;
    filtering, by the processor, the set of pages for each of the partitions into a first set of pages that correspond to the keywords and a second set of pages that do not correspond to the keywords;
    generating, by the processor, filtered search result data indicative of the first set of pages;
    transmitting, by the processor, the filtered search result data;
    accessing an index queue for selecting pages corresponding to the partition summary index;
    parsing the pages into groups based on tokens associated with each of the pages, wherein each of the tokens correspond to a word;
    assigning an identifier to the token;
    recording the identifier of the token; and
    generating a second partition summary index using the identifier.

2. The method of claim 1, further comprising:
    generating, by the processor, the partition summary index from a data store that includes the pages or a sequence of pages.

3. The method of claim 2, the generating the partition summary index further comprising:
    generating, by the processor, a page partition key for each of the pages or the sequence of pages;
    augmenting, by the processor, each of the pages or the sequence of pages with the page partition key; and
    adding, by the processor, each of the augmented pages or the augmented sequence of pages with the page partition key to the index queue.

4. The method of claim 3, further comprising:
    selecting, by the processor, a set of pages from the index queue;
    generating, by the processor, a third partition summary index for the set of pages;
    retrieving, by the processor, the partition summary index;
    generating, by the processor, a fourth partition summary index that includes the third partition summary index and the partition summary index; and
    storing, by the processor, the fourth partition summary index.

5. The method of claim 1, further comprising:
    identifying one or more pages that include a top-level domain page identifier;
    generating a page partition key for each of the one or more pages identified as including the top-level domain page identifier;
    augmenting for each of the one or more pages with the page partition key; and
    adding each of the augmented one or more pages with the page partition key to the index queue.

6. The method of claim 1, further comprising:
    identifying a domain for each page in a sequence of pages;
    generating a page partition key for each of the identified domains;
    assigning the page partition key to each of the identified domains; and
    adding each of the assigned page partition keys to the index queue.

7. The method of claim 1, further comprising:
identifying a common page identifier preface for a page;
generating a page partition key for the page by hashing the common page identifier preface;
assigning the page partition key to the page; and
adding the page that includes the page partition key to the index queue.

8. The method of claim 1, further comprising:
accessing the index queue for selecting pages corresponding to the partition summary index;
parsing the pages into groups based on tokens associated with each of the pages, wherein each of the tokens correspond to a word; and
generating a third partition summary index by concatenating each of the group of pages associated with a token.

9. The method of claim 1, further comprising:
accessing the index queue for selecting pages corresponding to the partition summary index;
parsing the pages into groups based on tokens associated with each of the pages, wherein each of the tokens correspond to a word;
identifying the token that corresponds to a word on a stop-word list;
removing the identified token from the pages; and
generating a third partition summary index.

10. The method of claim 1, further comprising:
accessing an index queue for selecting pages corresponding to the partition summary index;
parsing the pages into groups based on tokens associated with each of the pages, wherein each of the tokens correspond to a word;
determining a frequency of the token included within the pages exceeds a threshold;
removing the token that exceeds the threshold; and
generating a third partition summary index.

11. The method of claim 1, further comprising:
accessing the index queue for selecting pages corresponding to the partition summary index;
parsing the pages into groups based on tokens associated with each of the pages, wherein each of the tokens correspond to a word;
generating hash keys for each of the tokens; and
based on the hash keys, generating a third partition summary index.

12. The method of claim 11, wherein the generating the hash keys for each of the tokens further comprises:
assigning each of the tokens to a hash value, via a hash function.

13. A computing device, comprising:
a processor;
a non-transitory storage medium for tangibly storing thereon modules for execution by the processor, the modules comprising:
a page retrieval engine module configured to generate results responsive to a query;
a partition summary retrieval index module configured to store summaries attributable to partitions that include keywords, wherein the summaries attributable to the partitions are independent of storing description of individual pages;
a fetch module configured to retrieve pages that correspond to a partition;
a page filter module configured to determine that one or more of the pages includes the keywords that are included in the query; and
a page analysis module configured to:
access an index queue for selecting pages corresponding to the partition summary index;
parse the pages into groups based on tokens associated with each of the pages, wherein each of the tokens correspond to a word;
assign an identifier to the token;
record the identifier of the token; and
generate a second partition summary index using the identifier.

14. The computing device of claim 13, further comprising a query input module configured to receive the query that includes the keywords.

15. The computing device of claim 13, further comprising a query analysis module configured to:
analyze the query to extract the keywords from the query; and
access the page retrieval engine module to generate the results responsive to the query.

16. The computing device of claim 13, further comprising a partition summary index generation module configured to generate a partition summary index from partitions, wherein the partition summary index includes the summaries attributable to the partitions.

17. The computing device of claim 13, further comprising a retrieval module configured to analyze the keywords in the query to determine the partitions that correspond to the query.

18. The computing device of claim 13, wherein the page analysis module is further configured to:
parse the pages into groups based on the tokens associated with each of the pages, wherein each of the tokens correspond to a word;
determine a frequency of a token included within the pages exceeds a threshold; and
remove the token that exceeds the threshold.

19. The computing device of claim 13, wherein the page analysis module is further configured to:
parse the pages into groups based on the tokens associated with each of the pages, wherein each of the tokens correspond to a word; and
generate hash keys for each of the tokens.

20. The computing device of claim 13, wherein the fetch module retrieves the pages that correspond to the partition based on a uniform resource locator.

21. The computing device of claim 13, wherein the page filter module is further configured to:
generate search result data indicative of the pages that are determined to correspond to the keyword; and
send the search result data.

22. The computing device of claim 13, further comprising a partitioning module configured to:
receive the pages that correspond to the partition;
assign to each of the pages a partition key; and
generate partition summaries for each of the partitions.

23. The computing device of claim 13, further comprising a merger module configured to:
access a first partition summary;
select a set of pages from an index queue;
generate a third partition summary that includes the second partition summary and the first partition summary; and
store the third partition summary.

24. A system comprising:
a device comprising:
at least one memory storing computer-executable instructions; and at least one processor in communication with the at least one memory, the at least one processor configured to execute the computer-executable instructions to:

receive query data indicative of a search that includes keywords;

access a partition summary index for a set of partitions that correspond to the keywords configured to store summaries of individual partitions independent of storing descriptions of individual pages;

determine the set of partitions that correspond to the keywords;

fetch, for each partition in the set of partitions that correspond to the keywords, a first set of one or more pages;

determine a second set of the one or more pages that correspond to the keywords;

generate search result data indicative of the second set of pages;

access an index queue for selecting pages corresponding to the partition summary index;

parse the pages into groups based on tokens associated with each of the pages, wherein each of the tokens correspond to a word;

assign an identifier to the token;

record the identifier of the token; and generate a second partition summary index using the identifier.

25. The system of claim 24, wherein the at least one processor is further configured to execute the computer-executable instructions to:

access the index queue for selecting pages corresponding to the partition summary index;

parse the pages into groups based on the tokens associated with each of the pages, wherein each of the tokens correspond to a word;

generate hash keys for each of the tokens; and based on the hash keys, generate a third partition summary index.

26. The system of claim 24, wherein the at least one processor is further configured to execute the computer-executable instructions to:

select a set of pages from an index queue;

generate a third partition summary index that includes the second partition summary index and the partition summary index; and store the third partition summary index.

27. The system of claim 24, wherein the search result data indicative of the set of pages that are determined to correspond to the keyword.

28. The system of claim 24, wherein the at least one processor is further configured to execute the computer-executable instructions to:

access the index queue for selecting pages corresponding to the partition summary index;

parse the pages into groups based on the tokens associated with each of the pages, wherein each of the tokens correspond to a word;

determine that a frequency of a token included within the pages exceeds a threshold;

remove the token that exceeds the threshold; and generate a third partition summary index.

29. The system of claim 24, wherein the at least one processor is further configured to execute the computer-executable instructions to:

select a set of pages from the index queue;

generate a third partition summary index for the set of pages;

apply a first weight value to tokens included in the second partition summary index;

apply a second weight value to tokens included in the third partition summary index, generate a fourth partition summary index that includes the second partition summary index and the third partition summary index; and store the fourth partition summary index.

30. The system of claim 29, wherein the first weight value and the second weight value are based on one or more of:

a first value that indicates a frequency of the tokens included in the partition summary index or the second partition summary index, or a second value that indicates an age of the set of pages used to generate the partition summary index or the second partition summary index.

* * * * *